(12) United States Patent
Fukuyama

(10) Patent No.: US 6,896,930 B2
(45) Date of Patent: May 24, 2005

(54) METHOD FOR MANUFACTURING A POLYESTER FIBER CORD FOR REINFORCING RUBBER MATERIALS

(75) Inventor: Tomonori Fukuyama, Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/402,980

(22) Filed: Apr. 1, 2003

(65) Prior Publication Data

US 2003/0198794 A1 Oct. 23, 2003

(30) Foreign Application Priority Data

Apr. 18, 2002 (JP) ........................................ 2002-116614

(51) Int. Cl.⁷ .............................. B05D 1/38; B05D 3/02
(52) U.S. Cl. ........................................ 427/381; 427/412
(58) Field of Search ................................ 427/379, 381, 427/412

(56) References Cited

U.S. PATENT DOCUMENTS 4,978,409 A * 12/1990 Fujiwara et al. ............ 156/315

FOREIGN PATENT DOCUMENTS

| JP | 47-049768 | * | 12/1972 |
| JP | 51-070394 | * | 6/1976 |
| JP | 60-031950 B | * | 7/1985 |
| JP | 61-042545 | * | 3/1986 |
| JP | 63-227868 | * | 9/1988 |
| JP | 04-011077 | * | 1/1992 |
| JP | 06-123078 | * | 5/1994 |
| JP | 08-013346 | * | 1/1996 |
| JP | 08-060555 | * | 3/1996 |
| JP | 09-003776 | * | 1/1997 |
| JP | 09-111050 | * | 4/1997 |
| JP | 10-121379 | * | 5/1998 |
| JP | 10-273877 | * | 10/1998 |
| JP | 11-034182 | * | 2/1999 |
| JP | 2000-008280 | * | 1/2000 |

* cited by examiner

Primary Examiner—Erma Cameron
(74) Attorney, Agent, or Firm—Morrison & Foerster LLP

(57) ABSTRACT

There is provided a method for manufacturing a polyester fiber cord for reinforcing rubber materials that has an excellent adhesive property to rubber materials, and maintains a good adhesive property even after exposed to high temperatures in a state being compounded with rubber materials. Said method is characterized in that a first aqueous processing liquid comprising a blocked polyisocyanate compound is applied to a polyester fiber that has been beforehand provided with an epoxy compound during a yarn manufacturing process or in a state of a twisted cord in an amount of 0.5 to 5.0% based on the fiber weight in terms of solids of the blocked isocyanate compound; the treated yarn is dried at a yarn temperature of $\geq(A+20)°$ C., wherein A° C. is a dissociation temperature of the blocked isocyanate, and then subjected to heat treatment; and a second processing liquid comprising resorcin-formalin-rubber latex is applied to the yarn, followed by heat treatment.

6 Claims, No Drawings

METHOD FOR MANUFACTURING A POLYESTER FIBER CORD FOR REINFORCING RUBBER MATERIALS

BACKGROUND OF THE INVENTION

1. Field of the Invention

The present invention relates to a method for manufacturing a polyester fiber cord that is treated with an adhesive and used for reinforcing rubber products, such as tires, hoses, conveyor belts, V belts, power transmission belts, rubber containers, and the like.

2. Description of the Prior Art

Polyester fibers are superior in mechanical properties, dimensional stability, and durability, and they are widely used not only for garments usage but also for industrial usage and for reinforcing rubber materials, such as tire cords, V belts, conveyor belts, hoses, and the like. However, in comparison with nylon fibers, they have a drawback that their adhesive property to rubber materials is decreased; in particular, when they are embedded into rubber compounds and are exposed to high temperatures for a long period of time, their adhesion strength is remarkably deteriorated. It has been considered that decrease in adhesive strength of a polyester fiber in rubber compounds is caused by degradation of the polyester fiber due to action of amines and water contained in the rubber compounds, and many proposals have been given in order to overcome this drawback.

On the other hand, for using a cord in V belts, in some cases, a cord is cut in a longitudinal direction when it is embedded in rubber materials to be molded into a belt. Then, cohesiveness of the cord itself is also an important property. However, heretofore, in order to give such a property, the cord needs to be treated with a polyisocyanate in the presence of an organic solvent, or the like. For example, JP 51-70394 A discloses a method in which a polyester fiber containing no more than 10 $\mu$eq/g of carboxyl terminal groups is subjected to treatment with an epoxy compound as well as treatment with a polyisocyanate compound and treatment with a resorcine formaldehyde latex (RFL). However, the method is impractical because the polyisocyanate treatment is carried out in an organic solvent system, and the method is of three-stage dipping treatment.

Further, since this organic solvent has high environmental burdens, a recovery step is required, and protection measure for healthy maintenance of workers is also required, leading to decrease in workability. Furthermore, in this method, since a device having explosion-proof construction is required for the treatment, a large-scale device is needed, which causes disadvantage in cost.

As an example of a system in which an organic solvent is not used, JP 60-31950 B discloses a method for manufacturing a polyester fiber wherein treatment with a liquid comprising a carrier is carried out at least prior to treatment with an adhesive, and thereby obtaining a polyester fiber material demonstrating little decrease in adhesive strength at the time of being exposed to high temperatures in rubber materials for a long period of time, and the method demonstrates some effect in a heat-resistant adhesive property. However, the method has a problem of deterioration of strength and fatigue resistance.

Furthermore, JP 2000-8280 A discloses a method for manufacturing a polyester fiber material for reinforcing rubber materials, wherein a fiber cord is treated with a treating liquid comprising a carrier, an aqueous solution of blocked isocyanate, a dispersion of epoxy resin, and a resorcin-formaldehyde latex mixture, and thereby obtaining a polyester fiber having a remarkably improved heat-resistant adhesive property at the time of being exposed to high temperatures for a long period of time in a state where the fiber cord is embedded in rubber compounds. In this method, since the carrier contained in the processing liquid is considered to have a high burden to environment, the method is not practically preferable.

OBJECTS OF THE INVENTION

One object of the present invention is to provide a method for manufacturing a polyester fiber cord that has an excellent adhesive property to rubber materials, maintains a good adhesive property even after exposed to high temperatures in a state being compounded with rubber materials, and demonstrates high cohesiveness of the cord itself, and that gives low burden to environment.

This object as well as other objects and advantages of the present invention will become apparent to those skilled in the art from the following description.

SUMMARY OF THE INVENTION

The 1st aspect of the present invention is a method for manufacturing a polyester fiber cord for reinforcing rubber materials having an improved adhesive property to rubber materials which comprises the steps of:

applying a first aqueous processing liquid comprising a blocked polyisocyanate compound to a polyester fiber, that has been beforehand provided with an epoxy compound during a yarn manufacturing process or in a state of a twisted cord to activate adhesion, in an amount of 0.5 to 5.0% based on the fiber weight in terms of solids of the blocked isocyanate compound;

drying the treated yarn at a yarn temperature of $\geq(A+20)°$ C., wherein A° C. is a dissociation temperature of the blocked isocyanate, subjecting the dried yarn to heat treatment;

applying a second processing liquid comprising resorcin-formalin-rubber latex to the resultant yarn, and subjecting the yarn to heat treatment.

The 2nd aspect is the method for manufacturing a polyester fiber cord for reinforcing rubber materials having an improved adhesive property with rubber materials according to the 1st aspect, wherein the blocked polyisocyanate is a water-soluble blocked polyisocyanate having hydrophilic group(s).

The 3rd aspect is the method for manufacturing a polyester fiber cord for reinforcing rubber materials having an improved adhesive property with rubber materials according to the 1st aspect, wherein a thermal dissociation temperature of a blocking agent component of the blocked polyisocyanate is 100° C. to 200° C.

The 4th aspect is the method for manufacturing a polyester fiber cord for reinforcing rubber materials having an improved adhesive property with rubber materials according to the 1st aspect, wherein the blocked polyisocyanate is a water-soluble blocked polyisocyanate having hydrophilic group(s), and a thermal dissociation temperature of the blocking agent component is 100° C. to 200° C.

The 5th aspect is the method for manufacturing a polyester fiber cord for reinforcing rubber materials having an improved adhesive property with rubber materials according to the 1st aspect, wherein the polyester fiber is a polyethylene terephthalate based fiber.

The 6th aspect is a method for manufacturing a polyester cord for reinforcing rubber materials having an improved adhesive property with rubber materials which comprises the steps of:

treating a polyester fiber with an epoxy compound having two or more epoxy groups during a yarn manufacturing process, or a yarn twisting process;

subjecting the resultant to heat treatment at 150° C. to 260° C. to obtain drawn yarn; and twisting the yarn to obtain the cord.

The present invention also provides the polyester cord obtained by the method of the present invention and rubber materials comprising the polyester cord obtained by the method of the present invention.

DETAILED DESCRIPTION OF THE INVENTION

Polyester fiber materials used in the present invention are cords or textiles woven therewith that are manufactured by twisting drawn yarn obtained by melt spinning of polyethylene terephthalates or copolymerized polyethylene terephthalates with a small amount of a third component.

Preferably, the polyester fiber materials comprise polyester fibers whose surface is activated with an epoxy compound or isocyanate compound in a stage of non-drawn yarn or drawn yarn, as described in JP 47-49768 B. In particular, especially extremely superior effect can be obtained, when the polyester fiber materials are cords or woven textiles thereof manufactured by twisting drawn yarn obtained by treatment with an epoxy compound having two or more epoxy groups during a spinning or drawing step, followed by subjecting to heat treatment at 150° C. to 260° C.

Although components of the blocked isocyanate compound contained in the first processing liquid of the present invention are not especially limited, as the isocyanate component, polyisocyanates such as tolylene diisocyanate, diphenylmethane diisocyanate, hexamethylene diisocyanate, etc., can be used. As the blocking agent component, phenols, alcohols, oximes, lactams, etc., can be used. As the hydrophilic component for solubilizing in water, carboxyl group (or a salt thereof), sulfonic acid group (or a salt thereof), hydroxyl group, amide group, etc., is available. In particular, the blocking agent component having thermal dissociation temperature of 100° C. to 200° C. is desired.

Although a processing liquid containing a carrier and an aqueous solution of a blocked isocyanate is used as a first processing liquid in JP2000-8280 A, this carrier is considered to have a high burden to environment, and therefore use of the carrier is not preferable in view of environmental care.

Then, the present inventor has studied intensively. As a result, it has been found that a polyester fiber cord, which maintains a good adhesion even after exposed to high temperatures, can be obtained by applying a first processing liquid, which is an aqueous processing liquid comprising a water-soluble blocked isocyanate to a fiber in an amount of 0.5 to 5.0%, preferably 2.0 to 4.5% based on the fiber weight; drying the treated yarn at a yarn temperature of $\geq(A+20)°$ C., wherein $A°$ C. is a dissociation temperature of the blocked isocyanate, for 60 to 240 seconds, preferably 90 to 180 seconds, and then subjecting the dried yarn to heat treatment at 180 to 245° C., preferably 200 to 245° C. for 60 to 240 seconds, preferably 90 to 180 seconds.

When a pick-up to the fiber cord is less than 0.5% based on the fiber weight, an adhesive property after high temperature exposure becomes insufficient. On the other hand, when a pick-up to the fiber cord exceeds 5.0% based on the fiber weight, properties of the fiber cord itself, such as fatigue resistance, etc., are deteriorated.

Further, when the drying temperature does not reach the yarn temperature $(A+20)°$ C., preliminary dissociation of the blocked isocyanate does not sufficiently proceed, and thereby cohesiveness of the resin is deteriorated, leading to an insufficient adhesive property after high temperature exposure.

Furthermore, the first processing liquid is preferably of an aqueous solution of only a water-soluble blocked isocyanate compound, while, in addition to this, it may contain a plurality of conventional components used in a processing liquid for fibers to be used for reinforcing rubber materials, such as epoxy compounds, resorcin formalin resins, latexes, and the like.

Examples of the blocking agent component of the blocked isocyanate whose thermal dissociation temperature is preferably 100° C. to 200° C. include phenols, lactams, oximes, and the like. When a thermal dissociation temperature is lower than 100° C., a crosslinking reaction of isocyanates excessively proceeds in the drying step, and further, uneven permeation of the resin into the fiber occurs due to vaporization of coexisting water, thus leading to loss of cohesiveness. On the other hand, when the temperature is higher than 200° C., sufficient crosslinking reaction may hardly be taken place, which results in deterioration of a heat-resistant adhesive property.

The function of improvement of the heat-resistant adhesive property is considered to be a result of suppression of deterioration of the polyester by a synergistic effect derived from (i) the adoption of a water-soluble blocked isocyanate, which enables the isocyanate to permeate and diffuse into the fibers uniformly so that the isocyanate effectively acts as a scavenger of amines in rubber compounds which are causative materials of decrease in heat-resistant adhesive strength, and (ii) drying at a temperature no less than a dissociation temperature, which increases a resin crosslinking density to improve a barrier function against permeation of amines into the fibers.

This is also suggested from an extremely superior tenacity retention after over-vulcanization.

Furthermore, the water-soluble isocyanate compound permeates and diffuses into the fibers uniformly, and the preliminary dissociation at a temperature of no less than a dissociation temperature increases a resin crosslinking density, thereby improving cohesive power of the resin filled between single yarn in the fiber cord. Finally, this results in improvement of cohesive power of the fiber cord itself. Thus, it is possible to obtain a cord having high cohesive power which is hardly spread out between single yarn even if the cord is cut in a longitudinal direction thereof in case of using in V belts, etc.

The second processing liquid may be an aqueous mixed solution of an initial stage-condensation product obtained by reacting resorcin and formalin in the presence of an acid or alkali catalyst, and one or more materials such as styrene butadiene latexes, carboxyl group-containing styrene butadiene latexes, styrene butadiene vinylpyridine latexes, acrylonitrile butadiene latexes, natural rubbers, polybutadiene latexes, and the like. The mixing ratio of resorcin, formalin, and latex may be any of well-known one in this technique.

After this processing liquid is applied to the fiber, drying is carried out at a temperature of 60 to 200° C., preferably 90 to 180° C. for 60 to 240 seconds, preferably 90 to 180 seconds, followed by heat treatment at a temperature of 180 to 245° C., preferably 200 to 240° C. for 45 to 200 seconds, preferably 60 to 180 seconds.

Further, the second processing liquid may contain a blocked isocyanate compound, an epoxy compound, and other components to give cohesiveness to the cord. The thus-obtained polyester fiber cord for reinforcing rubber materials of the present invention provides a polyester rubber tire cord having an excellent adhesive property to rubber materials as well as a good adhesive property even when it is exposed to high temperatures after combination with rubber materials, and high cohesiveness of the cord itself.

Hereinafter the present invention will be illustrated in more detail with reference to Examples, but the present invention is not limited by them. Each physical property value was measured by the following methods:

(Strength and Elongation)

After a sample was allowed to stand for 24 hours or more in a thermostatic chamber controlled at a temperature and a humidity of 20° C. and 65% RH, strength and elongation were measured according to JIS-L 1017, using a tensile machine.

(Cord Hardness)

Cord hardness was measured by Gurley method of JIS-L 1096. A load of 25 g was attached at a position below 2 inches from the fulcrum of a pendulum of Gurley type stiffness tester. A sample having a cord length of 1.5 inch was mounted on a chuck of a movable arm (sample length between the chuck and the free end of pendulum was set to 1.0 inch). The movable arm was actuated. A scale at the time when the sample just left the free end of the pendulum was defined as $R_G$, and cord hardness was calculated from the following formula. Cord hardness (mN)=$R_G$×0.969/cord gauge (inch)

(Pulling out Adhesive Strength)

Pulling out adhesive strength was evaluated by H test which was an improved modification of T test of JIS-L 1017 (A method). A treated cord 1 cm long was embedded into a rubber material. After vulcanization for at 140° C. for 40 minutes (initial), or at 170° C. for 60 minutes (over-vulcanization), the cord was pull out from the rubber material. The force (N/cm) required for pulling the cord out from the rubber material at a speed of 300 mm/min at ordinary temperature was defined as a pulling out adhesive strength.

(Deterioration of Tenacity in Rubber Material)

A treated cord was embedded into a rubber material and vulcanized at 170° C. for 60 minutes. Then, the cord was taken out from the rubber material and breaking tenacity after vulcanization was measured. Deterioration of tenacity in rubber material was expressed by a degree of retention obtained by comparing the breaking tenacity after vulcanization with that before vulcanization.

(Cord Cohesiveness)

A treated cord was embedded into a rubber material and vulcanized at 170° C. for 60 minutes. Then, the vulcanized sample was cut along the fiber axis direction, and existence of spreading out of single yarn was observed.

EXAMPLE 1

Two plies of polyethylene terephthalate raw material yarn of 1100 dtex (intrinsic viscosity 0.88 dl/g, tensile strength 8.3 cN/dtex), which was obtained by a conventional method and subjected to surface activation with an epoxy compound, were twisted together, and three plies of the twisted yarn were further twisted together to obtain a cord having a number of twist of 16×8 (t/10 cm). This cord was dipped in a first processing liquid, and then the cord containing the processing liquid was squeezed with a pair of squeezing rolls to remove excessive processing liquid. The cord treated with the processing liquid was dried in an oven at 120° C. for 100 seconds, and then subjected to heat treatment with tension of 1.14 cN/dtex in an oven at 240° C. for 60 seconds. Then, the cord was dipped into a second processing liquid and excessive liquid was removed by air. The resultant was dried in an oven at 0.240° C. for 100 seconds, and subjected to heat treatment with tension of 0.08 cN/dtex in an oven at 200° C. for 60 seconds.

Table 1 shows the processing liquid compositions used in Example 1. The reagent (A) used herein is a water-soluble blocked isocyanate having a dissociation temperature of a blocking agent of 90° C.

The cord thus obtained by the dip treatment in this way showed strength of 6.4 cN/dtex, and an isocyanate solid pick up rate of 3.7% by weight.

TABLE 1

| | | | Parts by weight | Solid content parts by weight |
|---|---|---|---|---|
| The first processing liquid | | | | |
| Soft water | | | 50.0 | — |
| Blocked isocyanate aqueous solution | Reagent A | | 50.0 | 15.0 |
| Total | | | 100.0 | 15.0 |
| The second processing liquid | | | | |
| RFL | Pre-aging 20 to 25° C. 6 hrs. | Soft water | 40.2 | — |
| | | Resorcin | 2.1 | 2.1 |
| | | 37% formalin aqueous solution | 2.3 | 0.85 |
| | | 12% NaOH aqueous solution | 1.4 | 0.17 |
| | Post-aging 20 to 25° C. 20 hrs. | Reagent B | 27.4 | 11.2 |
| | | Reagent C | 9.8 | 4.8 |
| | | 25% aqueous ammonia | 2.3 | 0.58 |
| | | Soft water | 12.6 | — |
| Blocked isocyanate aqueous solution | Reagent A | | 1.9 | 0.57 |
| Total | | | 100.0 | 20.3 |

A) blocked polyurethane prepolymer, solid content: 30%, water soluble, dissociation temperature: 90° C.
B) Styrene-butadiene-2-vinylpyridine copolymer, solid content: 41%
C) Styrene-butadiene copolymer, solid content: 49%

EXAMPLE 2

According to the same manner as that described in Example 1, the raw material yarn whose surface was activated with an epoxy compound was subjected to the dip treatment except that the reagent (A) in the first processing liquid and the second processing liquid was replaced by a reagent (A) which was a water-soluble blocked isocyanate having a dissociation temperature of 180° C., and the yarn treated by the first processing liquid was dried at a yarn temperature of 200° C. The resultant treated cord showed strength of 6.5 cN/dtex, and an isocyanate solid pick up rate of 3.8% by weight.

COMPARATIVE EXAMPLE 1

According to the same manner as that described in Example 1, dip treatment was carried out except that, instead of the raw material yarn whose surface was activated with an epoxy resin, polyethylene terephthalate material yarn of 1100 dtex obtained by a conventional method without no surface activation (intrinsic viscosity 0.88 dl/g, tensile strength 8.3 cN/dtex) was used. Two plies of the yarn were twisted together, three plies of the twisted yarn were further twisted to obtain a cord of a number of twist of 16×8 (t/10 cm) and the resultant was subjected to the dip treatment. The treated cord showed strength of 6.5 cN/dtex and an isocyanate solid pick up rate of 3.7% by weight.

COMPARATIVE EXAMPLE 2

According to the same manner as that described in Example 1, dip treatment was carried out except that processing liquids shown in table 2, which were a typical example of using a water-dispersed blocked isocyanate, were used instead of the processing liquids in Example 1. The treated cord showed strength of 6.2 cN/dtex and an isocyanate solid pick up rate of 3.5% by weight.

TABLE 2

| | | | Parts by weight | Solid content parts by weight |
|---|---|---|---|---|
| A first processing liquid | | | | |
| Soft water | | | 50.0 | — |
| Blocked isocyanate water dispersion | Reagent D | | 50.0 | 15.0 |
| Total | | | 100.0 | 15.0 |
| A second processing liquid | | | | |
| RFL | Pre-aging 20 to 25° C. 6 hrs. | Soft water | 40.2 | — |
| | | Resorcin | 2.1 | 2.1 |
| | | 37% formalin aqueous solution | 2.3 | 0.85 |
| | | 12% NaOH aqueous solution | 1.4 | 0.17 |
| | Post-aging 20 to 25° C. 20 hrs. | Reagent B | 27.4 | 11.2 |
| | | Reagent C | 9.8 | 4.8 |
| | | 25% aqueous ammonia | 2.3 | 0.58 |
| | | Soft water | 12.6 | — |
| Blocked isocyanate aqueous solution | Reagent D | | 1.9 | 0.57 |
| Total | | | 100.0 | 20.3 |

D) Blocked polyurethane prepolymer, solid content: 30%, water-dispersed, dissociation temperature: 90° C.

COMPARATIVE EXAMPLE 3

According to the same manner as that described in Example 1, dip treatment was carried out by using the same raw material yarn except that an amount of pick up of the first processing liquid was adjusted to 0.4% based on the weight of the solid content of the isocyanate. The treated cord showed strength of 6.5 cN/dtex, and an isocyanate solid pick up rate of 0.37% by weight.

COMPARATIVE EXAMPLE 4

According to the same manner as that described in Example 1, dip treatment was carried out by using the same raw material yarn except that drying was carried out at a yarn temperature of 90° C. for 100 seconds after treatment with the first processing liquid. The treated cord showed strength of 6.5 cN/dtex, and an isocyanate solid pick up rate of 3.9% by weight.

COMPARATIVE EXAMPLE 5

According to the same manner as that described in Example 1, dip treatment was carried out by using the same raw material yarn except that processing liquids shown in table 2, which were a typical example of using a water-dispersed blocked isocyanate, were used instead of the processing liquids in Example 1 and an amount of pick up of the first processing liquid was adjusted to 0.4% based on the weight of the solid content of the isocyanate. The treated cord showed strength of 6.3 cN/dtex and an isocyanate solid pick up rate of 0.41% by weight.

COMPARATIVE EXAMPLE 6

According to the same manner as that described in Example 1, dip treatment was carried out by using the same raw material yarn except that processing liquids shown in table 2, which were a typical example of using a water-dispersed blocked isocyanate, were used instead of the processing liquids in Example 1 and drying was carried out at a yarn temperature of 90° C. for 100 seconds after treatment with the first processing liquid. The treated cord showed strength of 6.3 cN/dtex and an isocyanate solid pick up rate of 4.1% by weight.

COMPARATIVE EXAMPLE 7

According to the same manner as that described in Example 1, dip treatment was carried out by using the same raw material yarn except that an amount of pick up of the first processing liquid was adjusted to 0.4% based on the weight of the solid content of the isocyanate and drying was carried out at a yarn temperature of 90° C. for 100 seconds after treatment with the first processing liquid. The treated cord showed strength of 6.6 cN/dtex and an isocyanate solid pick up rate of 0.45% by weight.

COMPARATIVE EXAMPLE 8

According to the same manner as that described in Example 1, dip treatment was carried out by using the same raw material yarn except that processing liquids shown in table 2, which were a typical example of using a water-dispersed blocked isocyanate, were used instead of the processing liquids in Example 1, an amount of pick up of the first processing liquid was adjusted to 0.4% based on the weight of the solid content of the isocyanate, and drying was carried out at a yarn temperature of 90° C. for 100 seconds after treatment with the first processing liquid. The treated cord showed strength of 6.4 cN/dtex and an isocyanate solid pick up rate of 0.39% by weight.

Table 3 shows conditions of treatment and physical properties cords in obtained in Examples 1 through 3 and Comparative Examples 1 through 7. A heat-resistant adhesive property was evaluated by over vulcanization adhesive strength.

TABLE 3

|  | Example 1 | Example 2 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Conditions of treatment |  |  |  |  |  |  |  |  |  |  |
| Raw material yarn epoxy activated | Activated | activated | not activated | activated | activated | activated | activated | Activated | activated | activated |
| Isocyanate |  |  |  |  |  |  |  |  |  |  |
| Aqueous type | water soluble | water soluble | water soluble | water-dispersed | water soluble | water soluble | water-dispersed | water-dispersed | water soluble | water-dispersed |
| Dissociation temperature (° C.) | 90 | 180 | 90 | 90 | 90 | 90 | 90 | 90 | 90 | 90 |
| First processing liquid drying temperature (° C.) | 120 | 200 | 120 | 120 | 120 | 90 | 120 | 90 | 90 | 90 |
| RFL | activated | activated | activated | activated | activated | activated | activated | activated | activated | activated |
| Physical property of the cord |  |  |  |  |  |  |  |  |  |  |
| Isocyanate solid pick up rate (%) | 3.7 | 3.8 | 3.7 | 3.5 | 0.37 | 3.8 | 0.41 | 4.1 | 0.45 | 0.39 |
| Gurley method cord hardness (mN) | 182 | 219 | 138 | 138 | 143 | 127 | 99 | 83 | 88 | 44 |
| Tensile strength (N) | 464.5 | 472.2 | 471.8 | 449.1 | 456.6 | 472.2 | 442.7 | 459.0 | 464.0 | 449.7 |
| H adhesive strength |  |  |  |  |  |  |  |  |  |  |
| Initial (N/cm) | 199 | 201 | 114 | 169 | 165 | 184 | 135 | 154 | 150 | 120 |
| Over-vulcanized (N/cm) | 170 | 180 | 35 | 131 | 125 | 106 | 86 | 67 | 61 | 22 |
| Retention of degradation in rubber material strength % | 89 | 92 | 79 | 85 | 87 | 86 | 83 | 82 | 84 | 80 |
| Cord cohesiveness | ○ | ○ | ○ | ○ | X | ○ | X | X | X | X |

As seen from Table 3, the heat-resistant adhesive property and cord cohesiveness of the cords of Examples 1 and 2 of the present are superior to those of the cords of Comparative Examples 1 through 8. This sows that, in the cords of the present invention, chemical deterioration is suppressed and the plies of single yarn firmly interlock to each other. On the other hand, in Comparative Examples 1, 2, and 4, heat-resistant adhesion is remarkably decreased, though they have sufficient cord cohesiveness. In Comparative Examples 3, 5 through 8, both of heat-resistant adhesive property and cord cohesiveness are remarkably decreased.

As described hereinabove, according to the present invention, there is provided a polyester fiber cord for V belts, etc., that has a significantly improved heat-resistant adhesive property even after exposed to high temperatures, and demonstrates high cohesiveness of the cord itself, and a method for manufacturing the cord.

What is claimed is:

1. A method for manufacturing a polyester fiber cord for reinforcing rubber materials having an activated adhesive property to rubber materials which comprises the steps of:

applying a first aqueous processing liquid comprising a blocked polyisocyanate compound to a polyester fiber, that has been beforehand provided with an epoxy compound during a yarn manufacturing process or in a state of a twisted cord to activate adhesion, in an amount of 0.5 to 5.0% based on the fiber weight in terms of solids of the blocked isocyanate compound, wherein the first aqueous processing liquid does not include a carrier;

drying the treated yarn at a yarn temperature of $\geq(A+20)°$ C., wherein A° C. is a dissociation temperature of the blocked isocyanate, subjecting the dried yarn to heat treatment;

applying a second processing liquid comprising resorcin-formalin-rubber latex to the resultant yarn, and subjecting the yarn to heat treatment.

2. The method for manufacturing a polyester fiber cord for reinforcing rubber materials having an activated adhesive property with rubber materials according to claim 1, wherein the blocked polyisocyanate is a water-soluble blocked polyisocyanate having hydrophilic group(s).

3. The method for manufacturing a polyester fiber cord for reinforcing rubber materials having an activated adhesive property with rubber materials according to claim 1, wherein a thermal dissociation temperature of a blocking agent component of the blocked polyisocyanate is 100° C. to 200° C.

4. The method for manufacturing a polyester fiber cord for reinforcing rubber materials having an activated adhesive property with rubber materials according to claim 1, wherein the blocked polyisocyanate is a water-soluble blocked polyisocyanate having hydrophilic group(s), and a thermal dissociation temperature of the blocking agent component is 100° C. to 200° C.

5. The method for manufacturing a polyester fiber cord for reinforcing rubber materials having an activated adhesive property with rubber materials according to claim 1, wherein the polyester fiber is a polyethylene terephthalate based fiber.

6. The method of claim 1, comprising:
treating a polyester fiber with an epoxy compound having two or more epoxy groups during a yarn manufacturing process, or a yarn twisting process;
subjecting the resultant to heat treatment at 150° C. to 260° C. to obtain drawn yarn; and
twisting the yarn to obtain the cord.

* * * * *